United States Patent
Dayama et al.

(10) Patent No.: US 11,481,680 B2
(45) Date of Patent: Oct. 25, 2022

(54) VERIFYING CONFIDENTIAL MACHINE LEARNING MODELS

(71) Applicant: International Business Machines Corporation, Armonk, NY (US)

(72) Inventors: Pankaj S. Dayama, Bangalore (IN); Nitin Singh, Bangalore (IN); Dhinakaran Vinayagamurthy, Bangalore (IN); Vinayaka Pandit, Bangalore (IN)

(73) Assignee: International Business Machines Corporation, New York, NY (US)

( * ) Notice: Subject to any disclaimer, the term of this patent is extended or adjusted under 35 U.S.C. 154(b) by 369 days.

(21) Appl. No.: 16/851,507

(22) Filed: Apr. 17, 2020

(65) Prior Publication Data

US 2021/0326746 A1     Oct. 21, 2021

(51) Int. Cl.
  *G06N 20/00*   (2019.01)
  *G06F 11/34*   (2006.01)
  *G06F 11/36*   (2006.01)

(52) U.S. Cl.
  CPC ......... *G06N 20/00* (2019.01); *G06F 11/3466* (2013.01); *G06F 11/3608* (2013.01)

(58) Field of Classification Search
  CPC . G06F 11/3608; G06F 11/3466; G06N 20/00; G06N 5/003
  USPC ........................................................ 706/12
  See application file for complete search history.

(56) References Cited

U.S. PATENT DOCUMENTS

2018/0144265 A1* 5/2018 Bonawitz ............... G06N 5/022
2018/0293516 A1* 10/2018 Lavid Ben Lulu ...... G07C 3/00

OTHER PUBLICATIONS

Froelicher et al., Drynx: Decentralized, Secure, Verifiable System for Statistical Queries and Machine Learning on Distributed Datasets, Feb. 11, 2019.
Jia et al., Preserving Model Privacy for Machine Learning in distributed Systems, Feb. 27, 2018.
Wu et al., DIZK: A Distributed Zero-Knowledge Proof System, May 18, 2018.

* cited by examiner

*Primary Examiner* — John Q Chavis
(74) *Attorney, Agent, or Firm* — Ryan Mason & Lewis, LLP

(57) ABSTRACT

Methods, systems, and computer program products for verifying confidential machine learning models are provided herein. A computer-implemented method includes obtaining (i) a set of training data and (ii) a request, from a requestor, for a machine learning model, wherein the request is accompanied by at least a set of test data; obtaining a commitment from a provider in response to the request, the commitment comprising a special hash corresponding to parameters of a candidate machine learning model trained on the set of training data; revealing the set of test data to the requestor; obtaining, from the requestor, (i) a claim of performance of the candidate machine learning model for the test data and (ii) a proof of the performance of the candidate machine learning model; and verifying the claimed performance for the requestor based on (i) the special hash and (ii) the proof of the claimed performance.

20 Claims, 11 Drawing Sheets

VERIFYING CONFIDENTIAL MACHINE LEARNING MODELS

FIELD

The present application generally relates to information technology and, more particularly, to verifying confidential machine learning models.

BACKGROUND

There is currently a growing demand for high-quality machine learning (ML) models as they can, for example, improve efficiencies and/or provide new capabilities to systems. However, obtaining high-quality models is difficult due to limited supply of talented model providers. Model providers want to be rewarded based on the performance of such models, but, generally, are not willing to share the details of the models even for evaluation purposes. This makes it difficult for model requestors to verify the performance of the model before investing in it. In some cases, a model provider provides a well performing model (e.g., resource intensive) during evaluation phase and provides a different model at later time.

SUMMARY

In one embodiment of the present disclosure, techniques for verifying confidential machine learning models are provided. An exemplary computer-implemented method includes obtaining (i) a set of training data and (ii) a request, from a requestor, for a machine learning model, wherein the request is accompanied by at least a set of test data; obtaining a commitment from a provider in response to the request, the commitment comprising a special hash corresponding to parameters of a candidate machine learning model trained on the set of training data; revealing the set of test data to the requestor; obtaining, from the requestor, (i) a claim of performance of the candidate machine learning model for the test data and (ii) a proof of the performance of the candidate machine learning model; and verifying the claimed performance for the requestor based on (i) the special hash and (ii) the proof of the claimed performance.

Another exemplary of an embodiment includes a computer-implement method comprising obtaining at least one first commitment corresponding to a competition for building a machine learning model based on one or more criteria, the at least one first commitment comprising (i) a set of training data and (ii) a set of test data; revealing the set of training data to a plurality of competitors of the competition; obtaining, from the plurality of competitors, a plurality of second commitments corresponding to sets of machine learning model parameters of candidate machine learning models, the candidate machine learning models built based on (i) the set of training data and (ii) the one or more criteria; revealing, based on the at least one first commitment, the set of test data to the plurality of competitors; obtaining, from the plurality of competitors, (i) claims of performance of the candidate machine learning models on the set of test data and (ii) zero-knowledge proofs of the claimed performance; verifying the claimed performances based on (i) the plurality of second commitments and (ii) the zero-knowledge proofs; and selecting a winner of the competition based at least in part on the verifying, while maintaining confidentiality of the plurality of candidate machine learning models.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Figure 1:
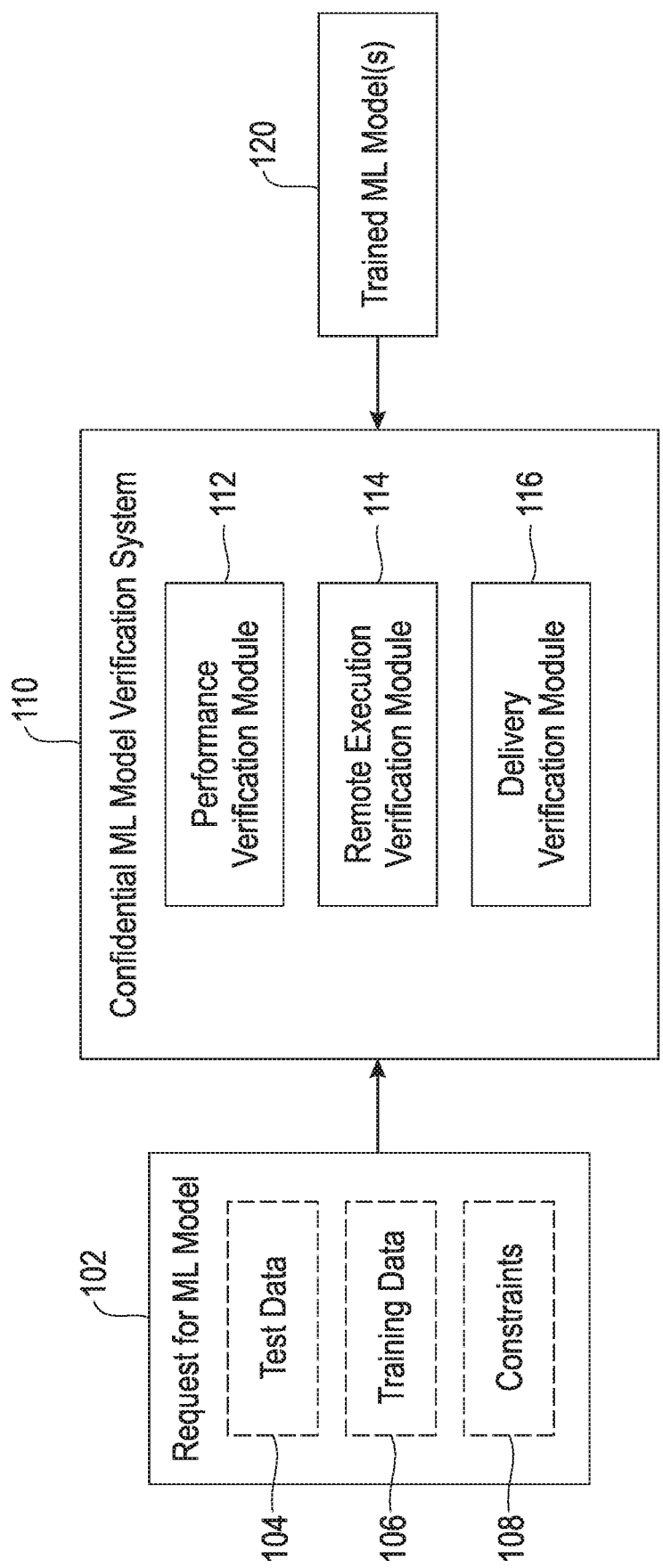
FIG. 1 is a diagram illustrating a system architecture in accordance with exemplary embodiments.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Various online marketplaces and platforms have been introduced to meet the increasing demand for high quality ML models including offerings from, for example, Kaggle.com (which provides a platform for predictive modeling competition), and Algorithmia Research (which provides an online AI marketplace). By way of example, platforms for predictive modeling competitions generally allow a verifier to obtain different ML models in order to determine a 'winner' for a given task based on the models' performance.

In such cases, it is possible that a malicious verifier may misreport the winner and/or accuracy of certain models. In some solutions, a provider's ML model is accessed by a requestor via an API. In these situations, the provider may update the model as it is not committed. Additionally, a verifier can infer characteristics about the model by appropriately designing a set of test data (referred to as a Model Extraction Attack).

In general, such solutions suffer from one or more of the following disadvantages: failing to preserve model confidentiality (i.e., preventing knowledge of the model from being obtained by the requestor), fairness in selection (e.g., in case of competition type platforms), and guaranteeing authenticity of models delivered.

In accordance with one or more exemplary embodiments described herein, a robust system may be provided to verify the claimed performance of a machine learning model while preserving complete model confidentiality. An exemplary embodiment includes techniques for a requestor to verify a claimed performance of a proprietary ML model using a hiding and binding commitment of model parameters and zero-knowledge proofs. Additionally, in at least some embodiments, the provider of the ML model is able to provide proof of remote execution that a legitimate ML model is executed. The proof can be verified by the requestor to guarantee that predictions are provided using the same model that was previously evaluated by the requestor. Also, in some example embodiments, the provider can provide a proof that indicates the ML model is the same as the ML model that was previously evaluated by the requestor.

Additionally, one or more example embodiments include techniques for providing a decentralized, trusted and fair platform for predictive model building competition that protects model confidentiality. The platform can commit to the training and test set and reveal the training set. Participants can train the model and make hiding and binding commitments of model parameters. The platform may reveal the test data set consistent with the commitment, and participants can report the performance of the model along with zero-knowledge performance proof. In some examples, the platform and/or other participants can verify the claimed performance of all of the models using the submitted performance proofs and the hiding and binding commitments. As such, a consensus on the best performing may be achieved while preserving model confidentiality.

FIG. 1 is a diagram illustrating system architecture in accordance with exemplary embodiments. By way of illustration, FIG. 1 depicts a confidential ML model verification system 110, which includes a performance verification module 112, a remote execution verification module 114, and a delivery verification module 116. In the example depicted in FIG. 1, a requestor may provide a request 102 for an ML model. The request 102 may include, for example, test data 104, training data 106, and one or more constraints 108, such as, for example, performance constraints. In some examples, the test data 104 may remain hidden until a specified event, such as, for example, until a submission period for the request has ended. Also, in some examples, the test data 104 may also be provided separately from the request 102. In response to the request 102, the confidential ML model verification system 110 may then receive one or more trained ML models 120 from different providers that attempt to satisfy the request 102. The performance verification module 112 verifies the performance of such models 120 for the requestor, while keeping the parameters corresponding to the trained models 120 confidential, as further discussed in conjunction with FIG. 2, for example.

Figure 2:
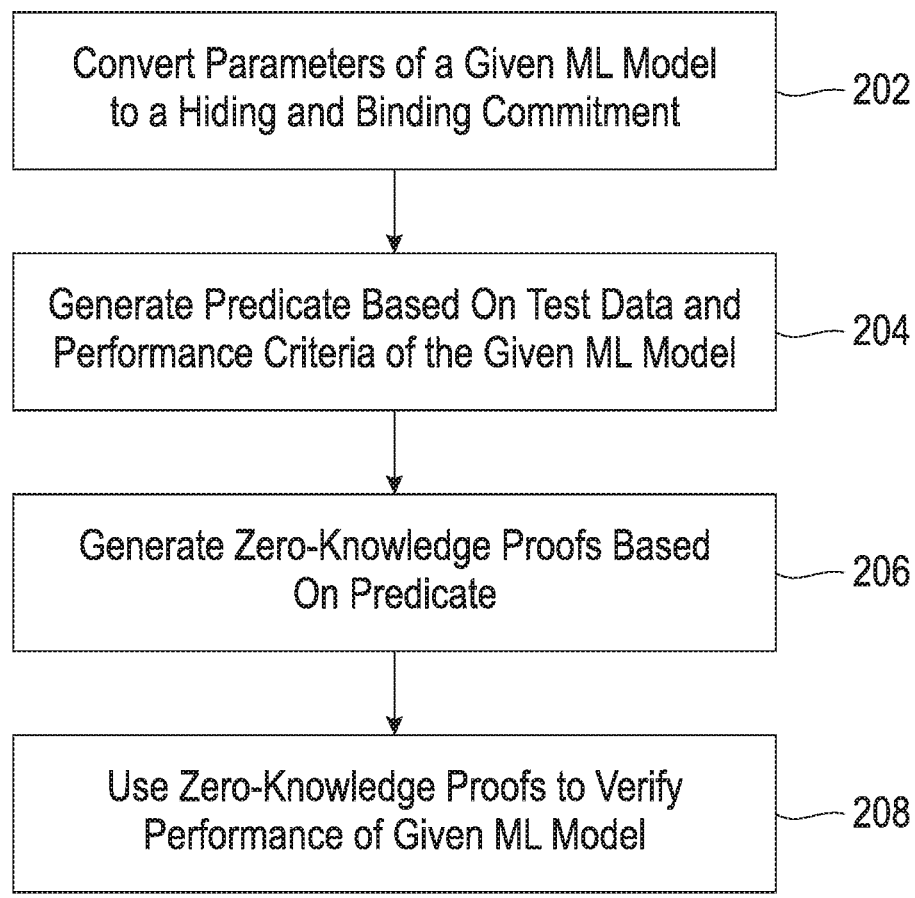
FIG. 2 is a diagram illustrating a performance verification process in accordance with exemplary embodiments.

The performance verification module 112 verifies the performance of such models 120 for the requestor, while keeping the parameters of the models 120 confidential, as further discussed in conjunction with FIG. 2, for example. Also, the remote execution verification module 114 can verify that a legitimate model is being used in situation when the ML model is being executed remotely (e.g., via API calls). If the requestor obtains a given one of the models 120, then the delivery verification module 116 can verify that the obtained model is the same as the model that was previously evaluated. As such, it is to be appreciated that the system 110 may include only a portion of the modules 112, 114, and 116 depending on the implementation.

FIG. 2 is a diagram illustrating a performance verification process in accordance with exemplary embodiments. The process depicted in FIG. 2 may correspond, at least in part, to operations of the performance verification module 112, for example. At step 202, a model owner (or provider) converts parameters of a given ML model to a hiding and binding commitment. Step 204 generates a predicate based on test data and performance criteria of the given ML model. At step 206, zero-knowledge proofs are then created based on the predicate. By way of example, step 206 may include parsing the predicate to construct a parse tree (using, e.g., a deterministic context free grammar). Computing hashes of all the values in the parse tree, and generating proofs to link the individual hashes in parse tree to a hash corresponding to the hiding and binding commitment from step 202. Next, the zero-knowledge proof is generated to show that the hashes at each node in the parse tree are consistent with the operation for the given node. At step 208, given a hash of the ML model and a claimed model performance, a verifier (e.g., system 100) also generates the predicate and the parse tree. The verifier may then check and validate the proof submitted by the provider of the ML model.

Figure 3:
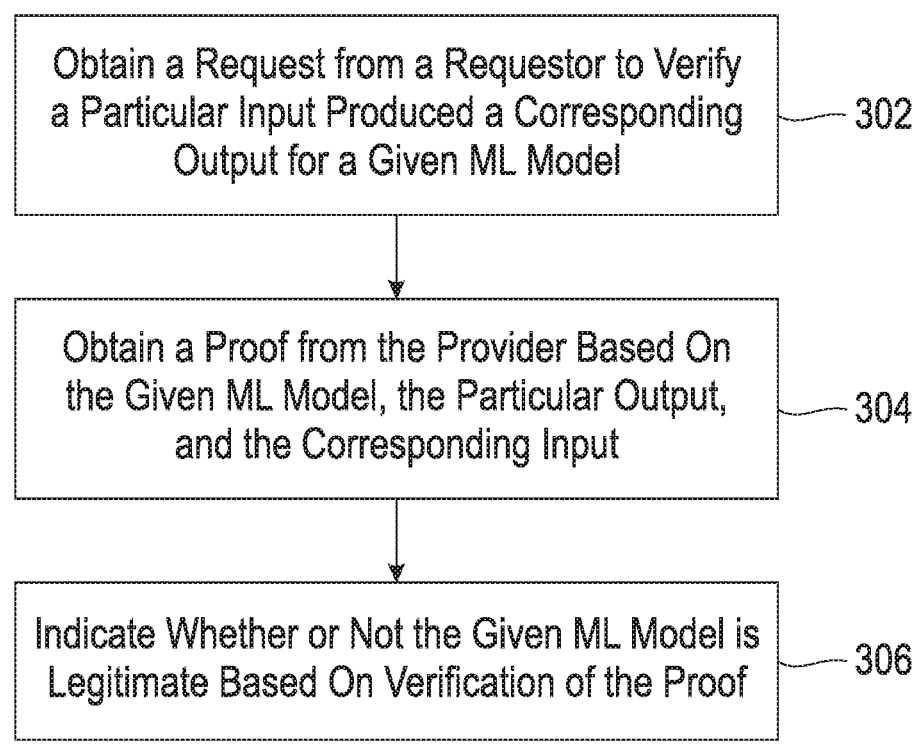
FIG. 3 is a diagram illustrating a remote execution verification process in accordance with exemplary embodiments.

FIG. 3 is a diagram illustrating a remote execution verification process in accordance with exemplary embodiments. The process depicted in FIG. 3 may correspond, at least in part, to operations of the remote execution verification module 114, for example. At step 302, a request is obtained from a requestor to verify a particular input produced a corresponding output for a given ML model. At step 304, a proof is obtained from the provider based on the given ML model, the particular output, and the corresponding input. At step 306, an indication is provided of whether the given ML model is legitimate based on verification of the proof.

By way of example, the process depicted in FIG. 3 may correspond to a situation where the given ML model is accessed via an API by the requestor. As such, in at least one example embodiment, the process may correspond to a Rest API for the model which takes input as a feature vector and outputs the predicted value. A requestor may select one of the last 'n' API calls and demand a proof for that call. In other words, if we let x and y denote the input and output for that particular API call, respectively, then the request demands a proof from the provider that y is the output for the input x by a model with commitment 'C'. The participant generates the required proof (e.g., using a similar procedure as described above with respect to FIG. 2, for example). The requestor then runs a verification routine to verify the proof. The verification will be successful if and only if a legitimate model was executed.

Figure 4:
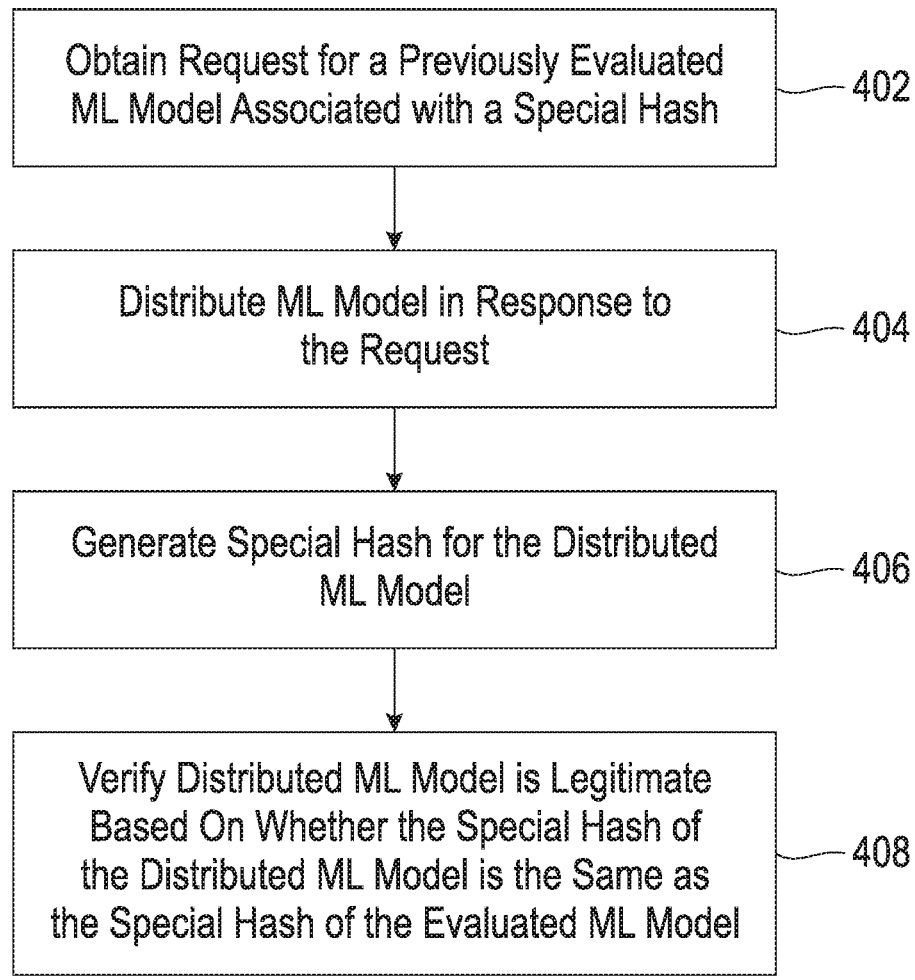
FIG. 4 is a diagram illustrating a model delivery verification process in accordance with exemplary embodiments.

FIG. 4 is a diagram illustrating a model delivery verification process in accordance with exemplary embodiments. The process depicted in FIG. 4 may be performed, at least in part, using delivery verification Module 116, for example.

Step 402 includes obtaining a request for a previously evaluated ML model, the previously evaluated ML model being associated with a special hash. Step 404 includes distributing the ML model in response to the request. Step 406 includes generating a special hash for the distributed model. At step 408, the requestor verifies that the distributed ML model is legitimate based on whether the special hash of the distributed ML model is the same as the special hash of the evaluated ML Model.

A model verification process according to one or more example embodiments includes the following steps: (1) converting a ML model to hash; (2) converting performance criteria to a predicate; (3) converting the predicate to a proof; and (4) verifying the proof. Each of these steps are discussed in more detail below.

Model to Hash

Figure 5:
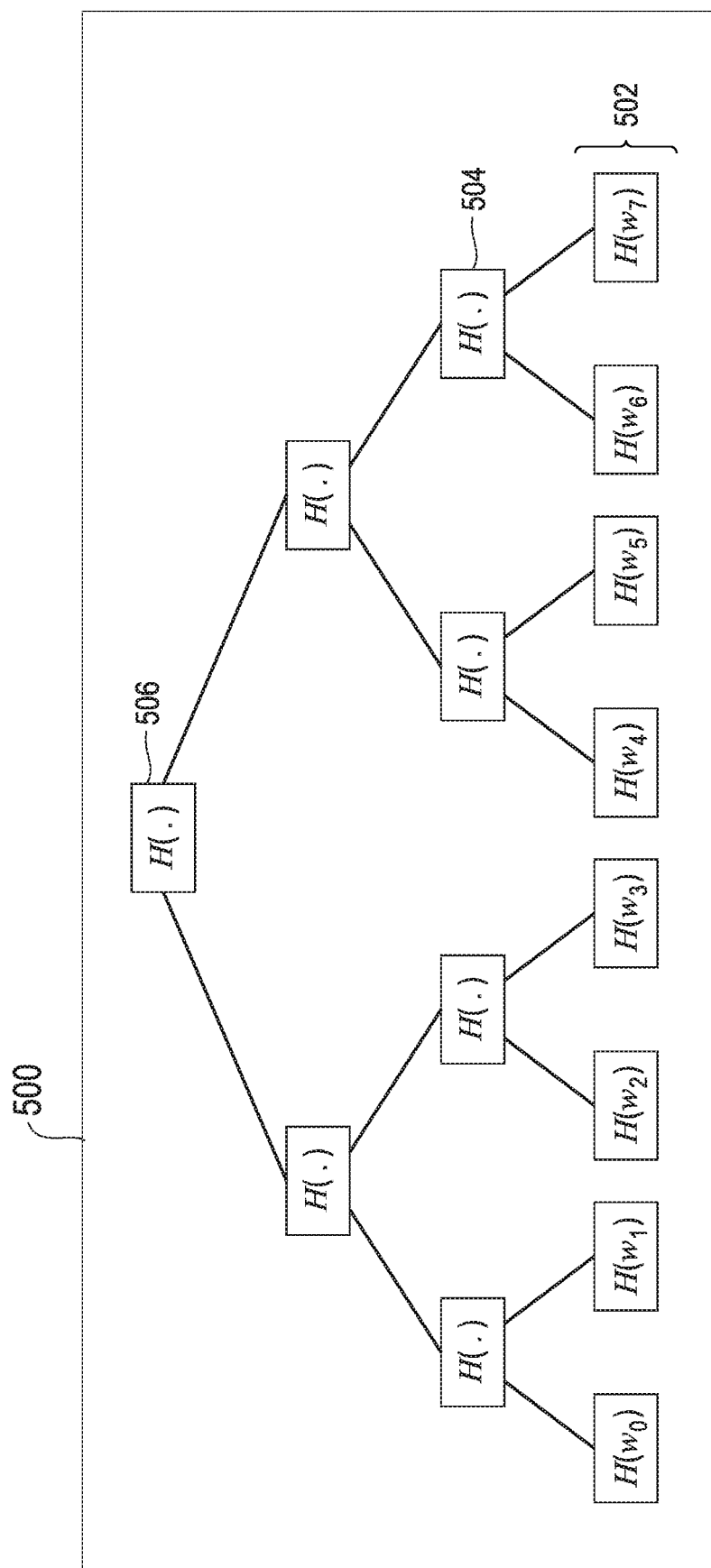
FIG. 5 is a diagram illustrating techniques for determining a model commitment in accordance with exemplary embodiments.

In at least one embodiment, the ML model may correspond to a linear model, and a hash of a linear model may be computed with a coefficient vector $w=(w_0 \ldots, w_k)$ in the manner depicted in FIG. 5, for example. In particular, FIG. 5 shows a tree 500 wherein the leaf nodes 502 include the hashes of coefficients in the vector w, and each parent node includes the hash of a concatenation of its child hashes. For example, the hash at parent node 504 is computed by concatenating the hash of coefficient $w_6$ with the hash of coefficient $w_7$. The hash obtained at root node 506 may then be used as the model commitment (such as, for example, described above with respect step 202 in FIG. 2).

Performance to Predicate

The step of converting the performance criteria to a predicate may correspond to step 204 in FIG. 2, for example. This step may include, for example, given a test input matrix X, test target column y, and $R^2$ threshold t, proving the model performance is equivalent to proving the following:

$$(\|y - Xw\|)^2 \leq (\|y - \bar{y}\|)^2 / (1 - t) \Leftrightarrow \quad (1)$$

$$\|y\|^2 \sum_{i,j} (x_i \cdot x_j)/w_i \cdot w_j \leq (\|y - \bar{y}\|)^2/(1-t) + 2\sum_i (x_i \cdot y)w_i \Leftrightarrow$$

$$C_0 \sum_{i,j} c_{ij} w_i \cdot w_j + C_1 + \sum_i c_i w_i$$

wherein, $C_0$, $C_1$, $\{C_i\}$, and $\{C_{i,j}\}$ are constants depending only on test data (X, y).

Predicate to Proof

Figure 6A:
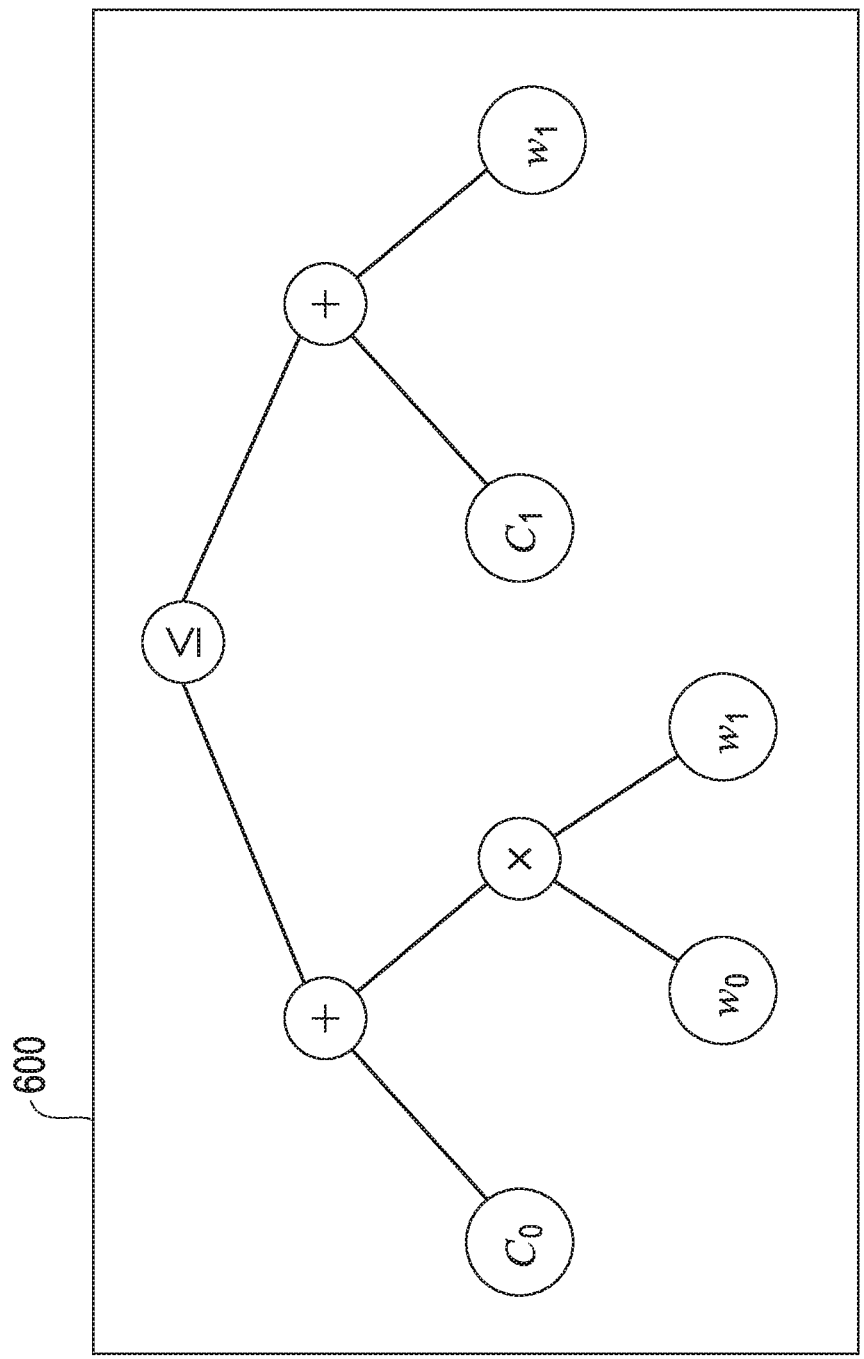
FIGS. 6A-6B are diagrams of parse trees in accordance with exemplary embodiments.
Figure 6B:
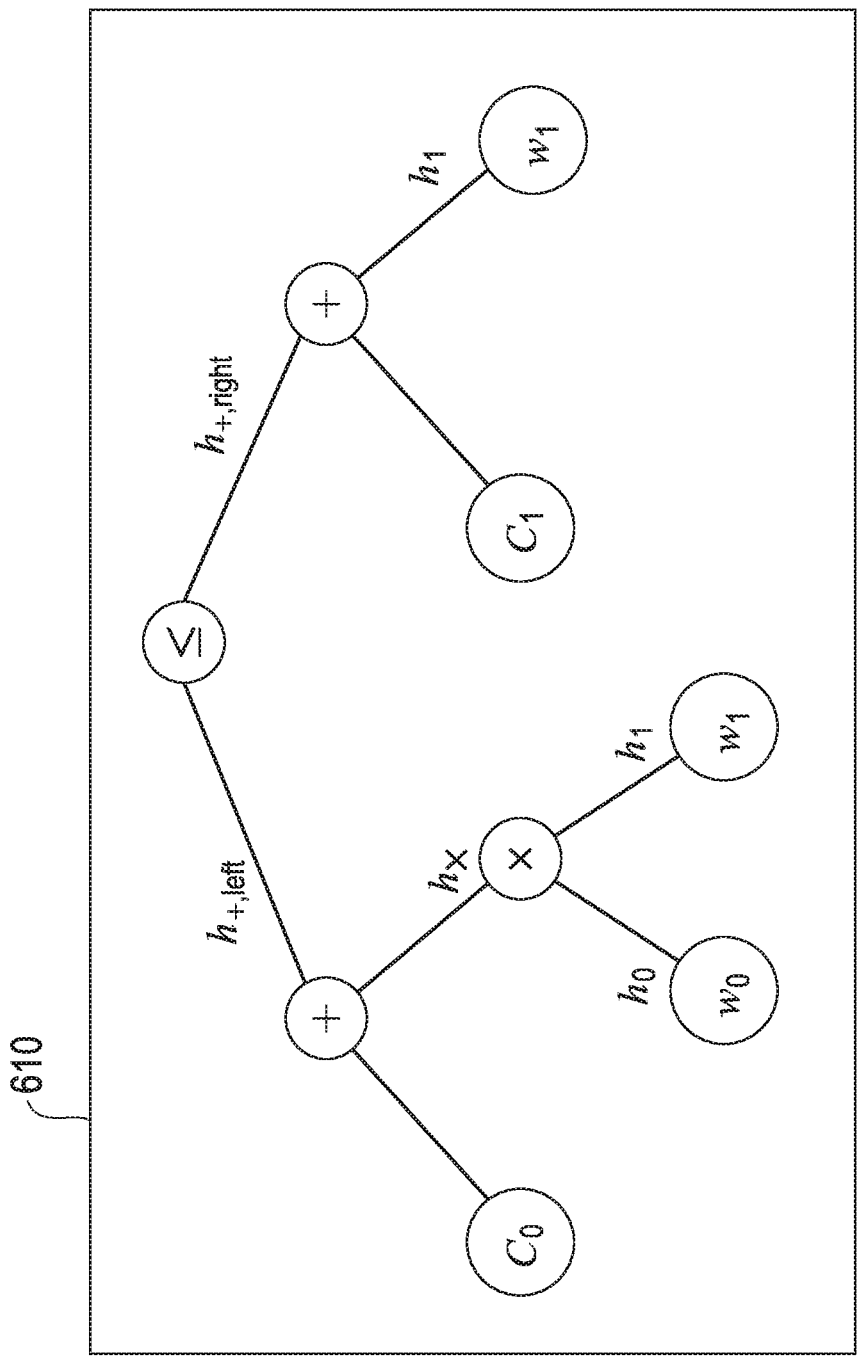

The step of converting the predicate to a proof may correspond to step 206 in FIG. 2, for example. This step may include, for example, given a hash of the model (H) as described in the Model to Hash step above, proving that the underlying model satisfies a predicate of the type in equation (1). For example, consider the simple predicate $C_0 + w_0 \cdot w_1 < C_1 + w_1$. First, the predicate is parsed to construct a parse tree 600 as shown in FIG. 6. Next, hashes are computed and shared for all values in the parse tree computation as shown in the parse tree 610 in FIG. 6B. Next, zero-knowledge proofs are constructed, which establish the predicate for the model hash H. More specifically, the following proofs are constructed:

Proofs to link individual hashes to model hash H: First, it is established that all leaf hashes like $h_0$, $h_1$ are consistent with the root hash (model hash) H. As an example, proving that $h_0$ is the first hash under H, is enabled by (roughly) sharing hashes on the path connecting leaf hash $h_0$ to the root hash H (this is commonly referred to as providing a Merkle authentication path).

Proofs to show hashes are compliant with computation: Having established that the hashes at the leaf nodes of parse tree are consistent with model hash H, zero-knowledge proofs are used to show that hashes incident at each node in the parse tree are consistent with the operation for the node. For example, a zero-knowledge proof is given to show that hashes $h_0$, $h_0$ and $h_X$ correspond to preimages $v_0$, $v_1$, $v_X$, satisfying $v_X = v_0 \cdot v_1$. Similar proofs are constructed for other nodes. It is noted that, any suitable zero-knowledge proof system may be used to construct these proofs as would be appreciated by those skilled in the art.

Verification of Proof

The step of verifying the proof may correspond to step 208 in FIG. 2, for example. Given a model hash (H) and claimed performance threshold t, this step may include generating the predicate corresponding to claimed performance by a verifier (in a similar manner as described above for the prover) and constructing a parse tree. It is assumed there is a deterministic way to construct the parse tree from the predicate (specified by a deterministic context free grammar rules). As part of the proof, the prover provides hashes for each node of the tree as shown earlier. Now, the verifier checks the following:

For the leaf hashes, verifier checks the Merkle authentication paths provided by the prover. This establishes whether the claimed leaf hash appears at the required position under the model hash H; and For each node, the verifier checks the zero-knowledge proof provided by the prover, which asserts that hashes incident at the node are compliant with the indicated computation.

Under this scheme, it is difficult for the prover to make a false claim about the performance. More particularly, in order to generate a false claim that passes verification, the prover would have to:

Produce a hash collision, which will allow the prover to use a different value of a parameter to generate the proof than the one used to obtain model commitment; and Violate the soundness of one of the zero-knowledge proofs, which can only succeed with negligible probability.

Figure 7:
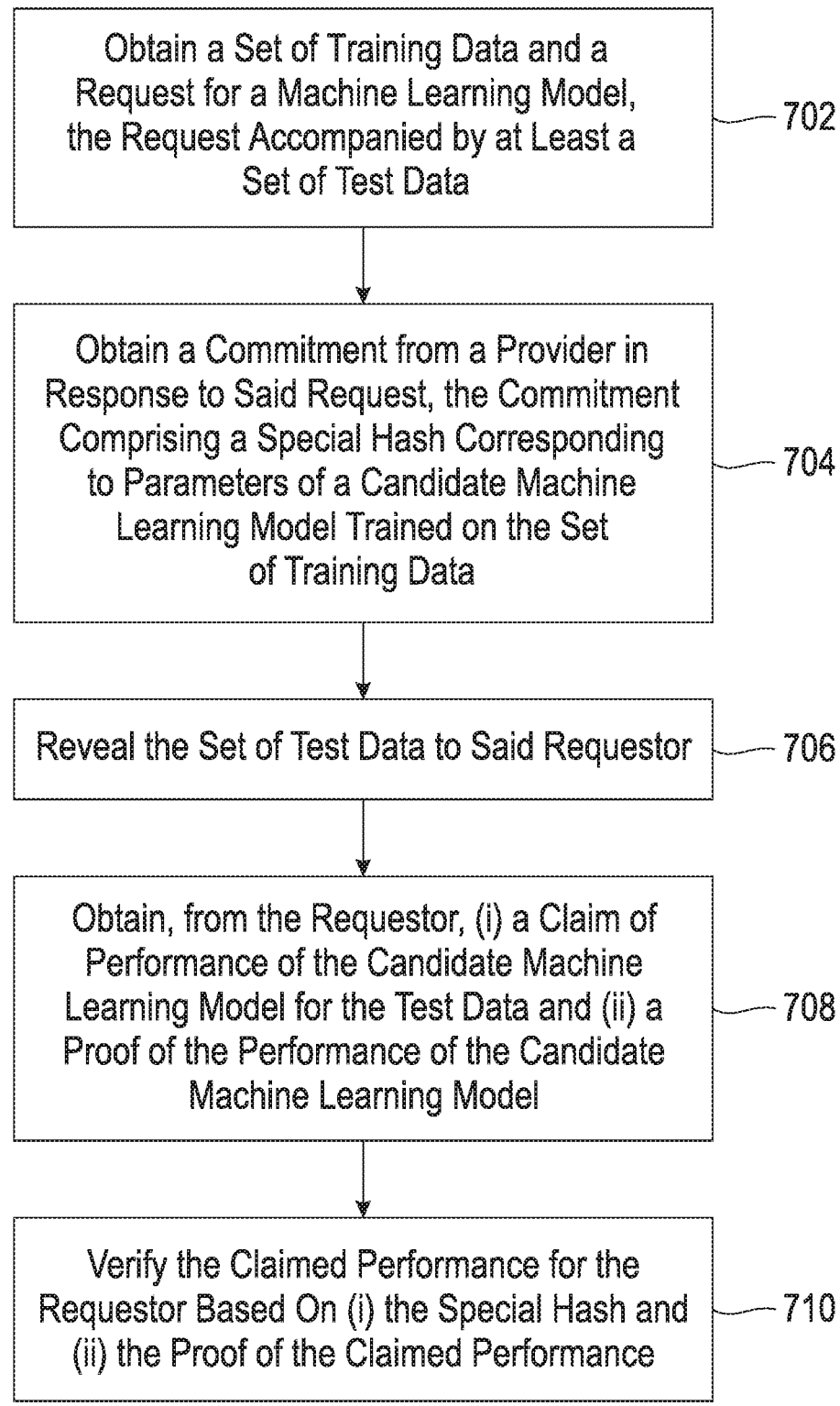
FIG. 7 is a flow diagram illustrating techniques in accordance with exemplary embodiments.

FIG. 7 is a flow diagram of a process in accordance with exemplary embodiments. Step 702 includes obtaining (i) a set of training data and (ii) a request, from a requestor, for a machine learning model, wherein the request is accompanied by at least a set of test data. Step 704 includes obtaining a commitment from a provider in response to the request, the commitment comprising a special hash corresponding to parameters of a candidate machine learning model trained on the set of training data. Step 706 includes revealing the set of test data to the requestor. Step 708 includes obtaining, from the requestor, (i) a claim of performance of the candidate machine learning model for the test data and (ii) a proof of the performance of the candidate machine learning model. Step 710 includes verifying the claimed performance for the requestor based on (i) the special hash and (ii) the proof of the claimed performance.

The commitment may include a hiding and binding commitment. The proof of the claimed performance may include a zero-knowledge performance proof. The special hash may maintain confidentiality of the machine learning model from the requestor. The request may include one or more performance constraints. The one or more performance constraints may include an accuracy constraint and/or a size constraint. The process depicted in FIG. 7 may include the step of sending a request to the provider to verify that output, for a particular input provided by the requestor, corresponds to the candidate machine learning model. The process depicted in FIG. 7 may include steps of obtaining a further proof from the requestor corresponding to the particular input; and verifying the output based at least in part on the further proof. The process depicted in FIG. 7 may include steps of providing the candidate machine learning model to the requestor; and verifying that the provided candidate machine learning model is the same machine learning model used by the provider to generate the proof of the performance. The verifying may include generating a further special hash of the provided candidate machine learning model; and verifying that the further special hash matches the special hash of the machine learning model used by the provider to generate the proof of the performance.

According to another example of an embodiment, a computer-implemented method may include obtaining at least one first commitment corresponding to a competition for building a machine learning model based on one or more criteria, the at least one first commitment comprising (i) a set of training data and (ii) a set of test data; revealing the set of training data to a plurality of competitors of the competition; obtaining, from the plurality of competitors, a plurality of second commitments corresponding to sets of machine learning model parameters of candidate machine learning models, the candidate machine learning models built based on (i) the set of training data and (ii) the one or more criteria; revealing, based on the at least one first commitment, the set of test data to the plurality of competitors; obtaining, from the plurality of competitors, (i) claims of performance of the candidate machine learning models on the set of test data and (ii) zero-knowledge proofs of the claimed performance; verifying the claimed performances based on (i) the plurality of second commitments and (ii) the zero-knowledge proofs; and selecting a winner of the competition based at least in part on the verifying, while maintaining confidentiality of the plurality of candidate machine learning models.

Each of the plurality of second commitments may include a hiding and binding commitment. The one or more criteria may correspond to a type of prediction to be output by the machine learning model.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 8:
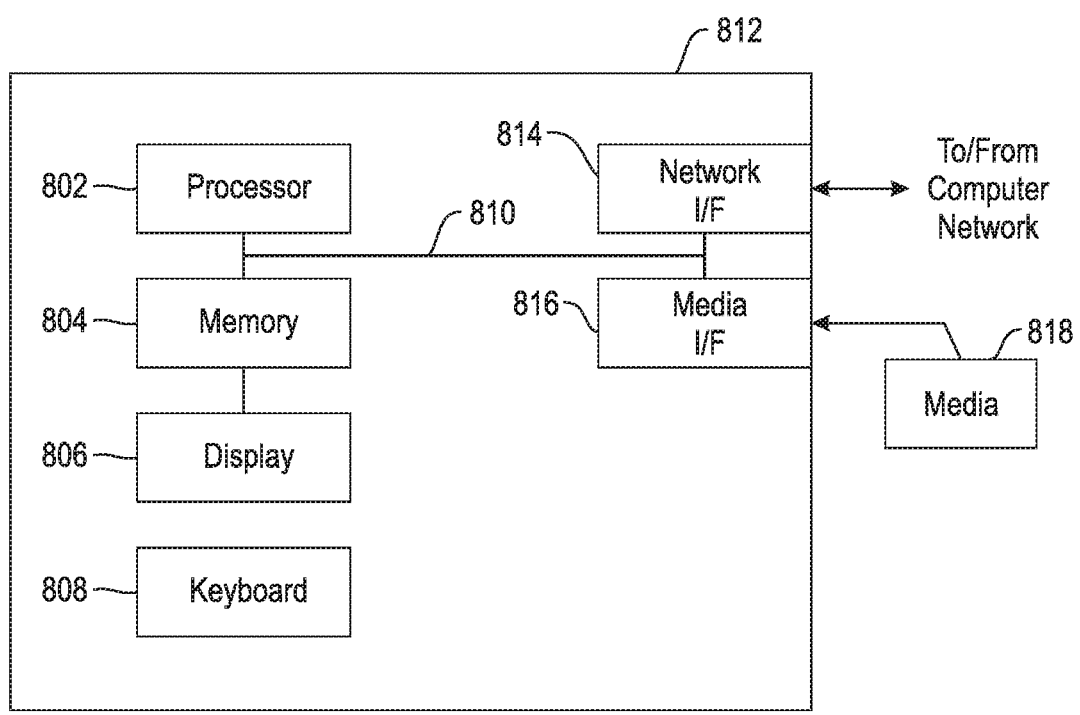
FIG. 8 is a system diagram of an exemplary computer system on which at least one embodiment of the present disclosure can be implemented.

Additionally, an embodiment of the present disclosure can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
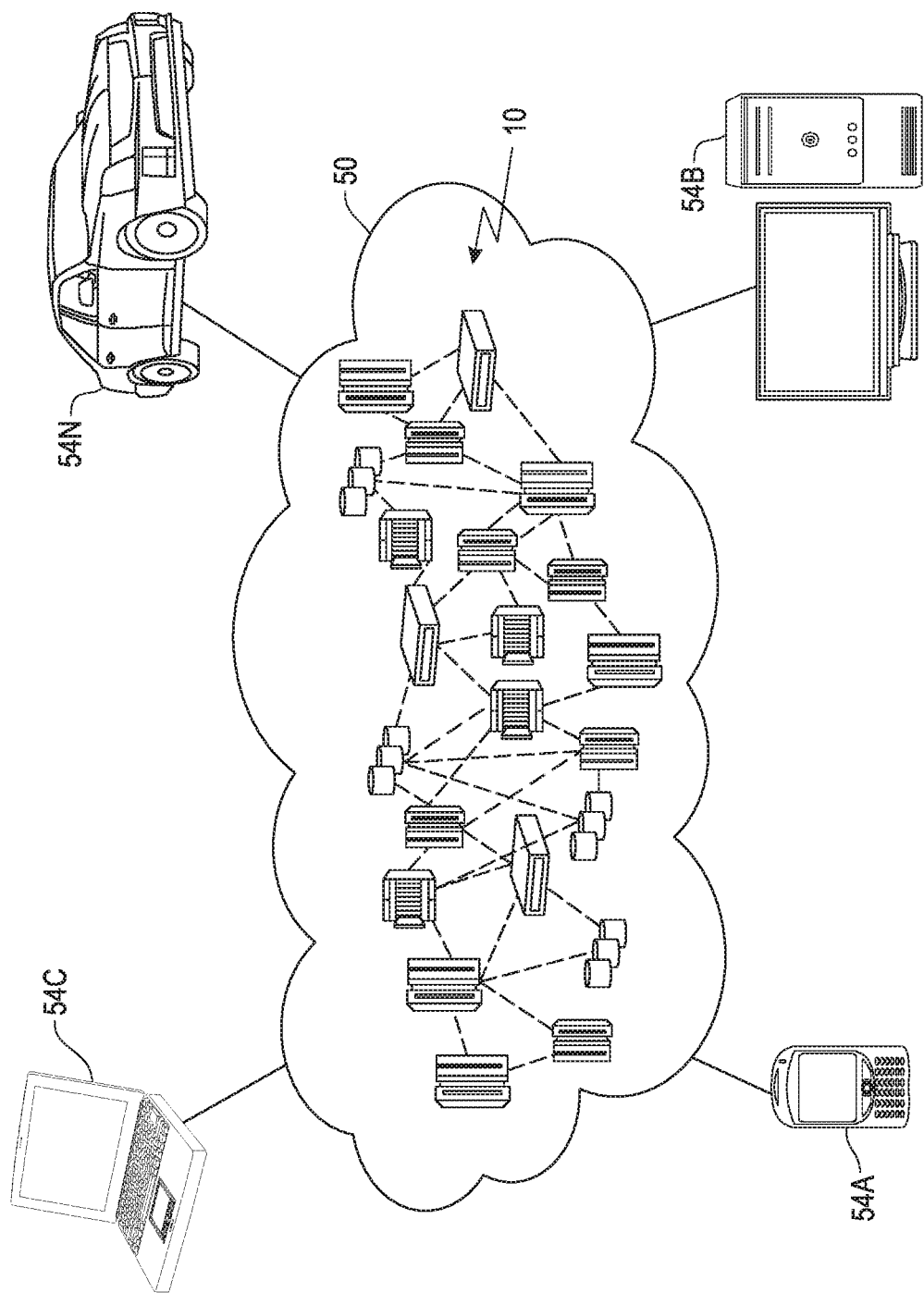
FIG. 9 depicts a cloud computing environment in accordance with exemplary embodiments.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
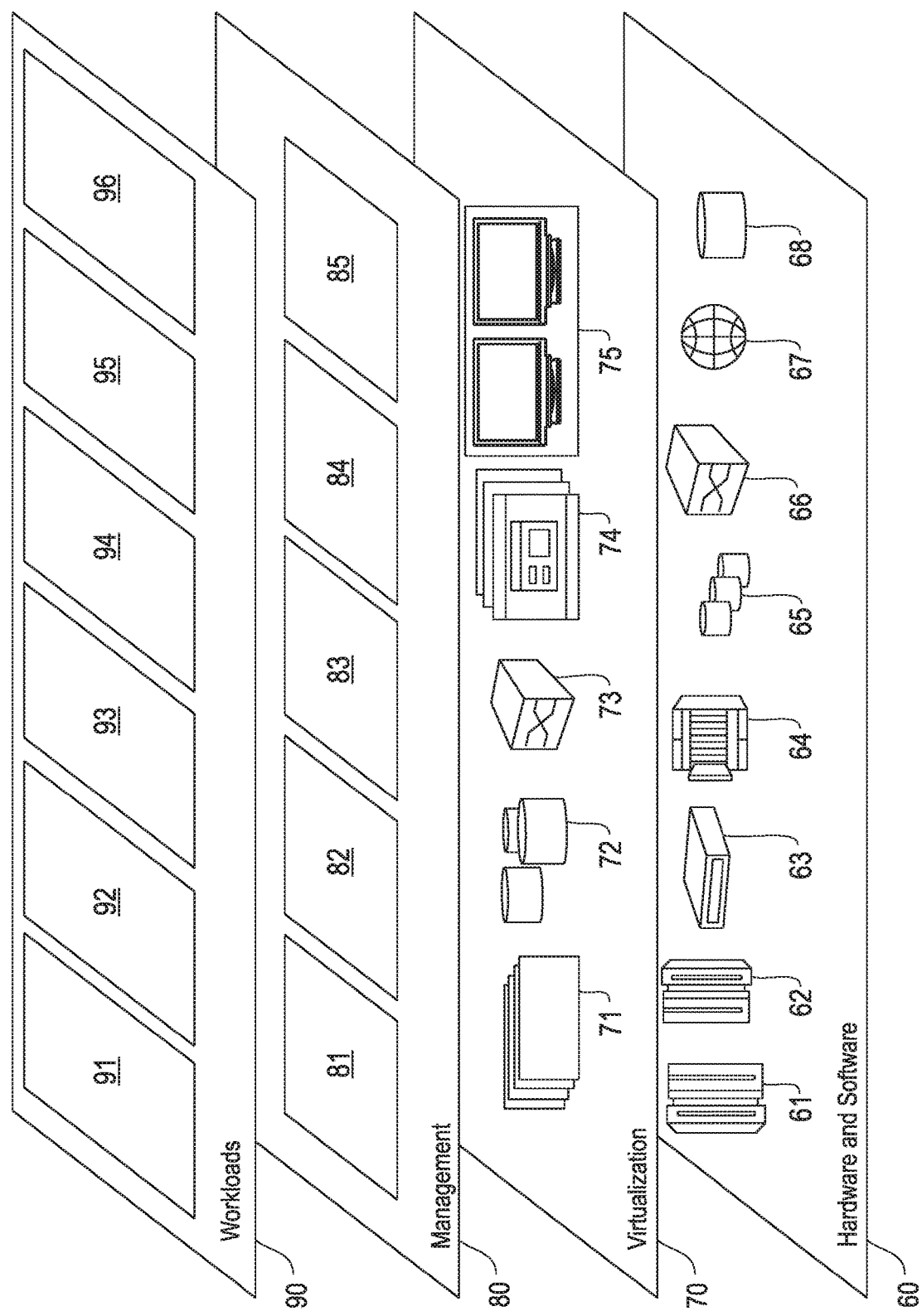
FIG. 10 depicts abstraction model layers in accordance with exemplary embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and verifying confidential machine learning models 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, allowing a provider of a machine learning model to keep characteristics of machine learning models confidential, while still allowing the requestor the ability to evaluate the machine model. Another beneficial effect of one or more embodiments of the present disclosure is, for example, the ability for a requestor to verify that a machine learning model delivered by a provider is the same model that the requestor evaluated, thus preventing providers from cheating or gaining advantages in a machine learning model market place, for example. Yet another beneficial effect of one or more embodiments of the present disclosure is, for example, to allow test data of a requestor to be kept secret until, for example, a machine learning model has been submitted. Also, a beneficial effect of one or more embodiments is providing a decentralized trusted and fair platform for predictive model building competition that protects model confidentiality.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   obtaining (i) a set of training data and (ii) a request, from a requestor, for a machine learning model, wherein the request is accompanied by at least a set of test data;
   obtaining a commitment from a provider in response to said request, the commitment comprising a special hash corresponding to parameters of a candidate machine learning model trained on the set of training data;
   revealing the set of test data to said requestor;
   obtaining, from the requestor, (i) a claim of performance of the candidate machine learning model for the test data and (ii) a proof of the performance of the candidate machine learning model; and
   verifying the claimed performance for the requestor based on (i) the special hash and (ii) the proof of the claimed performance;
   wherein the method is carried out by at least one computing device.

2. The computer-implemented method 1, wherein the commitment comprises a hiding and binding commitment.

3. The computer-implemented method of claim 1, wherein the proof of the claimed performance comprises a zero-knowledge performance proof.

4. The computer-implemented method of claim 1, wherein the special hash maintains confidentiality of the machine learning model from said requestor.

5. The computer-implemented method of claim 1, wherein the request comprises one or more performance constraints.

6. The computer-implemented method of claim 5, wherein the one or more performance constraints comprise an accuracy constraint and/or a size constraint.

7. The computer-implemented method of claim 1, comprising:
sending a request to the provider to verify that output, for a particular input provided by said requestor, corresponds to the candidate machine learning model.

8. The computer-implemented method of claim 7, comprising:
obtaining a further proof from said requestor corresponding to the particular input; and
verifying the output based at least in part on the further proof.

9. The computer-implemented method of claim 1, comprising:
providing the candidate machine learning model to the requestor; and
verifying that the provided candidate machine learning model is the same machine learning model used by the provider to generate the proof of the performance.

10. The computer-implemented method of claim 9, wherein said verifying comprises:
generating a further special hash of the provided candidate machine learning model; and
verifying that the further special hash matches the special hash of the machine learning model used by the provider to generate the proof of the performance.

11. A computer program product comprising a computer readable storage medium having program instructions embodied therewith, the program instructions executable by a computing device to cause the computing device:
to obtain (i) a set of training data and (ii) a request, from a requestor, for a machine learning model, wherein the request is accompanied by at least a set of test data;
to obtain a commitment from a provider in response to said request, the commitment comprising a special hash corresponding to parameters of a candidate machine learning model trained on the set of training data;
to reveal the set of test data to said requestor;
to obtain, from the requestor, (i) a claim of performance of the candidate machine learning model for the test data and (ii) a proof of the performance of the candidate machine learning model; and
to verify the claimed performance for the requestor based on (i) the special hash and (ii) the proof of the claimed performance.

12. The computer program product of claim 11, wherein the commitment comprises a hiding and binding commitment.

13. The computer program product of claim 11, wherein the proof of the claimed performance comprises a zero-knowledge performance proof.

14. The computer program product of claim 11, wherein the special hash protects a confidentiality of the machine learning model from said requestor.

15. The computer program product of claim 14, wherein the request comprises one or more performance constraints, the one or more performance constraints comprising an accuracy constraint and/or a size constraint.

16. The computer program product of claim 11, wherein the program instructions executable by a computing device further cause the computing device:
to send a request to the provider to verify that output, for a particular input provided by said requestor, corresponds to the candidate machine learning model;
to obtain a further proof from said requestor corresponding to the particular input; and
to verify the output based at least in part on the further proof.

17. A system comprising:
a memory; and
at least one processor operably coupled to the memory and configured for:
obtaining (i) a set of training data and (ii) a request, from a requestor, for a machine learning model, wherein the request is accompanied by at least a set of test data;
obtaining a commitment from a provider in response to said request, the commitment comprising a special hash corresponding to parameters of a candidate machine learning model trained on the set of training data;
revealing the set of test data to said requestor;
obtaining, from the requestor, (i) a claim of performance of the candidate machine learning model for the test data and (ii) a proof of the performance of the candidate machine learning model; and
verifying the claimed performance for the requestor based on (i) the special hash and (ii) the proof of the claimed performance.

18. A computer-implemented method, the method comprising:
obtaining at least one first commitment corresponding to a competition for building a machine learning model based on one or more criteria, the at least one first commitment comprising (i) a set of training data and (ii) a set of test data;
revealing the set of training data to a plurality of competitors of said competition;
obtaining, from said plurality of competitors, a plurality of second commitments corresponding to sets of machine learning model parameters of candidate machine learning models, the candidate machine learning models built based on (i) said set of training data and (ii) said one or more criteria;
revealing, based on said at least one first commitment, the set of test data to said plurality of competitors;
obtaining, from said plurality of competitors, (i) claims of performance of the candidate machine learning models on said set of test data and (ii) zero-knowledge proofs of the claimed performance;
verifying the claimed performances based on (i) the plurality of second commitments and (ii) the zero-knowledge proofs; and
selecting a winner of said competition based at least in part on said verifying, while maintaining confidentiality of said plurality of candidate machine learning models;
wherein the method is carried out by at least one computing device.

19. The computer-implemented method of claim 18, wherein each of the plurality of second commitments comprises a hiding and binding commitment.

20. The computer-implemented method of claim 18, wherein the one or more criteria correspond to a type of prediction to be output by said machine learning model.

* * * * *